US005533415A

United States Patent [19]
Ackermann et al.

[11] Patent Number: 5,533,415
[45] Date of Patent: Jul. 9, 1996

[54] STARTER APPARATUS FOR AN INTERNAL COMBUSTION ENGINE

[75] Inventors: Manfred Ackermann, Oppenweiler; Ngoc-Thach Nguyen, Grossbottwar; Siegfried Schustek, Ditzingen; Quang-Ngoc Tran, Stuttgart, all of Germany

[73] Assignee: Robert Bosch G.m.b.H., Stuttgart, Germany

[21] Appl. No.: 179,324

[22] Filed: Jan. 10, 1994

[30] Foreign Application Priority Data

Feb. 2, 1993 [DE] Germany ............... 43 02 854.3

[51] Int. Cl.$^6$ ................................. F02N 15/06
[52] U.S. Cl. .................. 74/7 E; 192/42; 192/212
[58] Field of Search ............... 74/7 E; 475/317, 475/331, 346, 347; 192/55, 42, 106.2

[56] References Cited

U.S. PATENT DOCUMENTS

| | | | |
|---|---|---|---|
| 1,561,506 | 11/1925 | Chilton | 74/7 E |
| 4,494,414 | 1/1985 | Hamano | 74/7 E |
| 4,503,719 | 3/1985 | Hamano | 74/7 E |
| 4,561,316 | 12/1985 | Bolz et al. | 74/7 E |
| 4,635,489 | 1/1987 | Imamura et al. | 74/7 E |
| 4,680,979 | 7/1987 | Morishita et al. | 74/7 E |
| 4,776,225 | 10/1988 | Morishita et al. | 74/7 E |
| 4,831,895 | 5/1989 | Tanaka et al. | 74/7 E |
| 4,848,172 | 7/1989 | Morishita | 74/7 E |
| 4,961,487 | 10/1990 | Langeneckert | 192/106.2 |
| 4,986,140 | 1/1991 | Morishita | 74/7 E |
| 5,032,107 | 7/1991 | Umeyama et al. | 192/106.2 |
| 5,088,338 | 2/1992 | Konishi | 74/7 E |
| 5,127,279 | 7/1992 | Barthruff | 74/6 |
| 5,323,663 | 6/1994 | Ohgi et al. | 74/7 E |
| 5,353,664 | 10/1994 | Yamamoto | 192/106.2 |
| 5,367,921 | 11/1994 | Fukushima | 192/106.2 |
| 5,377,560 | 1/1995 | Schierling et al. | 192/106.2 |

FOREIGN PATENT DOCUMENTS

| | | |
|---|---|---|
| 0090326 | 5/1983 | European Pat. Off. . |
| 0375396 | 4/1992 | European Pat. Off. . |
| 2592450 | 7/1987 | France . |
| 405853 | 7/1966 | Switzerland . |

*Primary Examiner*—Rodney H. Bonck
*Assistant Examiner*—David Fenstermacher
*Attorney, Agent, or Firm*—Michael J. Striker

[57] ABSTRACT

The starter apparatus for an internal combustion engine includes a starter motor; an axially shiftable starting gear engageable with a ring gear of the internal combustion engine; a drive train for transferring rotary motion of a drive shaft of the starter motor to the starting gear, the drive train including a plurality of parts from the starting gear to the drive shaft; a free wheel clutch coupled with the drive shaft of the starter motor; and a shock absorber spring device for damping torque shocks between the starting gear and the drive shaft occurring on operation of the starter and located in the drive train between the starting gear and the drive shaft of the starter motor. According to the invention the shock absorber spring device is prestressed to provide a torque acting in a drive rotation direction equal to from 15 to 50% of the stall torque of the starter motor delivered to the starting gear and a ratio of the torsional rigidity of another drive train equal to the above drive train without the shock absorber spring device and at the stall torque to the torsional rigidity of the shock absorber spring device effective at the starting gear must be at least 4.

21 Claims, 10 Drawing Sheets

STARTER APPARATUS FOR AN INTERNAL COMBUSTION ENGINE

BACKGROUND OF THE INVENTION

The present invention is related to a starter apparatus for an internal combustion engine.

A starter apparatus for an internal combustion engine is known including a starter motor provided with a drive shaft; an axially shiftable starting gear engageable with the ring gear of the internal combustion engine; a drive train for transferring rotary motion of the drive shaft of the starter motor to the starting gear, the drive train having a torsional rigidity and including a plurality of parts from the starting gear to the drive shaft; a free wheel clutch coupled with the drive shaft; and a shock absorbing means for damping torque shocks between the starting gear and the drive shaft occurring on rotation of the drive shaft.

A starting device, the so-called starter of the internal combustion engine, including means for damping the compression and decompression impacts in the starter mechanism is described in U.S. Pat. No. 4,561,316. This starter has a hollow gear in a planetary gear device used as a transmission gear unit in the starter which has shock damping means in the form of a rubber pad in its housing. A free wheel clutch is used for mechanical decoupling of the starter motor and the internal combustion engine, when the engine is running and has been accelerated by the starter rotation. The periodic release and engagement of the free wheel clutch because of the piston motion in the cylinders of the internal combustion engine due to its gas torque moment is an undesirable side effect in the so-called full rotation stage, in which the internal combustion engine has been put into rotation by the starter mechanism without accelerated combustion. This periodic release and engagement of the free wheel clutch depends on the moment of inertia values of the starter and the engine acting on the gear shaft and the drive torque of the starter and on the load on the crank shaft of the internal combustion engine. Fundamentally the released phase of the free wheel clutch is longer on starting with a transmission gear unit by which the starting moment of inertia is increased than on starting without it. A longer released phase results also at higher temperatures, since then the crankshaft friction moment is reduced, while the gas torque moment of the internal combustion engine increases.

When rotational play is present in the drive train of the starter having a starting gear, the starter mechanism exhausts this rotational play during each load change on engagement of the free wheel clutch and, because of that, a shock or impact is expected on the sides of the starting gear. These impacts on the gear teeth depend on the incorrect inertial moments of the starter and the crank shaft, on the total rotational play, on the rigidity of the starter drive train, on the differences in angular speed between the ring gear of the internal combustion engine and the starting gear as well as on the drive and load on the starting gear.

The known elastic support of the hollow gear in the starter housing with a rubber cushion or with a polygonal shaped rubber body between the hollow gear and the housing wall according to European Patent Document 0 375 396 A1 is not satisfactory at least in starter mechanisms of the larger and medium size starters, since this type of damping rubber has a strongly progressive characteristic curve and thus already is much too hard during a minimal deformation. The same goes for the starter described in U.S. Pat. No. 5,127,279, in which the drive shaft of the transmission gear unit connected with the starting gear is connected with a hollow gear by an elastic connecting means made from rubber or the like for damping the torque impacts or shocks occurring in the drive train during the starting process. Furthermore these damping elements would be destroyed in the course of time in the starter apparatus of larger and medium size by the comparatively very high shocks or impacts acting on them. Starter devices of comparatively higher power predominantly are equipped without transmission gear units because of these high shock loads. Because of that, a correspondingly larger expensive starter motor must be used and the impact loads must be received by the free wheel clutch responding in a pulsating manner, whereby also a loud noise is generated.

SUMMARY OF THE INVENTION

It is an object of the present invention to damp the rotational impacts, shocks and/or load spikes occurring in a starter for an internal combustion engine of the above-described type, particularly in the full rotation stage on engagement of the free wheel clutch of the starter to reduce the wear in the starters of larger power, to reduce mechanical power loss, to reduce noise generation and to reduce the eigenfrequency of the drive train.

These objects and others which will be made more apparent hereinafter are attained in a starter apparatus for an internal combustion engine including a starter motor provided with a drive shaft; an axially shiftable starting gear engageable with the ring gear of the internal combustion engine; a drive train for transferring rotary motion of the drive shaft of the starter motor to the starting gear, the drive train having a torsional rigidity and including a plurality of parts from the starting gear to the drive shaft; a free wheel clutch coupled with the drive shaft; and a shock absorbing means for damping torque shocks between the starting gear and the drive shaft occurring on rotation of the drive shaft.

According to one feature of the present invention a shock absorber spring means is arranged in the drive train of the starter apparatus and is prestressed to provide a torque acting in the drive direction equal to from 15 to 50% of a stall torque of the starter motor at the starting gear. Furthermore the ratio of a torsional rigidity of another drive train equal to the above-described drive train but without the shock absorber spring means and at the stall torque to a torsional rigidity of the shock absorber spring means effective at the starting gear must be at least 4.

The starter with the shock absorber spring means according to the invention provides a starter apparatus of higher power and reduces the shock load occurring, especially reduces the torque peaks formed on engagement of the free wheel clutch in the full rotation stage. Because of that, transmission gear units with larger reductions can be used for the starter devices of larger power. This means that the size of the starter can be reduced while retaining the same power level by increasing the rotational speed of the starter motor. Also because of the use of prestressed spring elements the oscillations of the starter drive train are drastically reduced whereby the spring displacement can be reduced in comparison to an shock absorber spring means without prestressing. Because of that, essentially completely linear response spring elements can be used in the shock absorber spring means according to the invention instead of the known rubber cushion as the damping elements, if necessary in a housing having the same dimensions as in the prior art starter. An additional substantial advantage is a definite reduction of the eigenfrequency of the starter drive train because of the shock absorber spring means according to the invention and, because of that, the desired damping of noise and shocks. It is also advantageous that the wear originating from the hard rotational shocks at the free wheel clutch and the teeth of the gears is now reduced.

A considerable advantage is provided according to the invention by the greatly reduced torque increase during the damping of the shocks by the coarse thread in the drive train; also there is a reduced axial force component which allows reduction of the pitch of the coarse thread and thus the meshing process occurs easier, for example with higher friction at a sticking starting gear sleeve. Furthermore a reduced coarse thread pitch has the advantage that in the catch up stage a reduced disengagement and thus reduced axial shocks occur during engagement of the free wheel clutch, which has the result that noise generation is substantially reduced.

Various embodiments of the starter according to the invention are possible. It is particular advantageous, when the drive train between the starter motor and the free wheel clutch contains a transmission gear unit so that the spring elements of the shock absorber spring means can engage on the transmission gear means and/or on the free wheel clutch. For noise damping and wear reduction it is especially appropriate to reduce the eigenfrequency of the rotary oscillations of the drive train by changing the spring stiffness of the shock absorber spring means to less than half that of the eigenfrequency without the shock absorber spring means.

A particularly desirable arrangement of the shock absorber spring means results, when it engages on the transmission gear unit of the drive train, particularly at the largest radial positions in the transmission gear unit, since there the shock load of the pretensioned shock absorber spring means is least. Thus it is particularly advantageous when the shock absorber spring means is mounted between a hollow gear of the planetary gears of the transmission gear unit and a housing-fixed part of the housing of the starter. There is then sufficient space available to form the shock absorber spring means from a plurality of spring elements engaged circumferentially on the hollow gear, which are braced on the housing-fixed housing part. The shock energy is distributed equally on the individual spring elements, which can be accordingly designed for a larger spring displacement and for smaller spring forces.

BRIEF DESCRIPTION OF THE DRAWINGS

The objects, features and advantages of the present invention will now be illustrated in more detail by the following detailed description, reference being made to the accompanying drawing in which.

DESCRIPTION OF THE PREFERRED EMBODIMENTS

Figure 1:
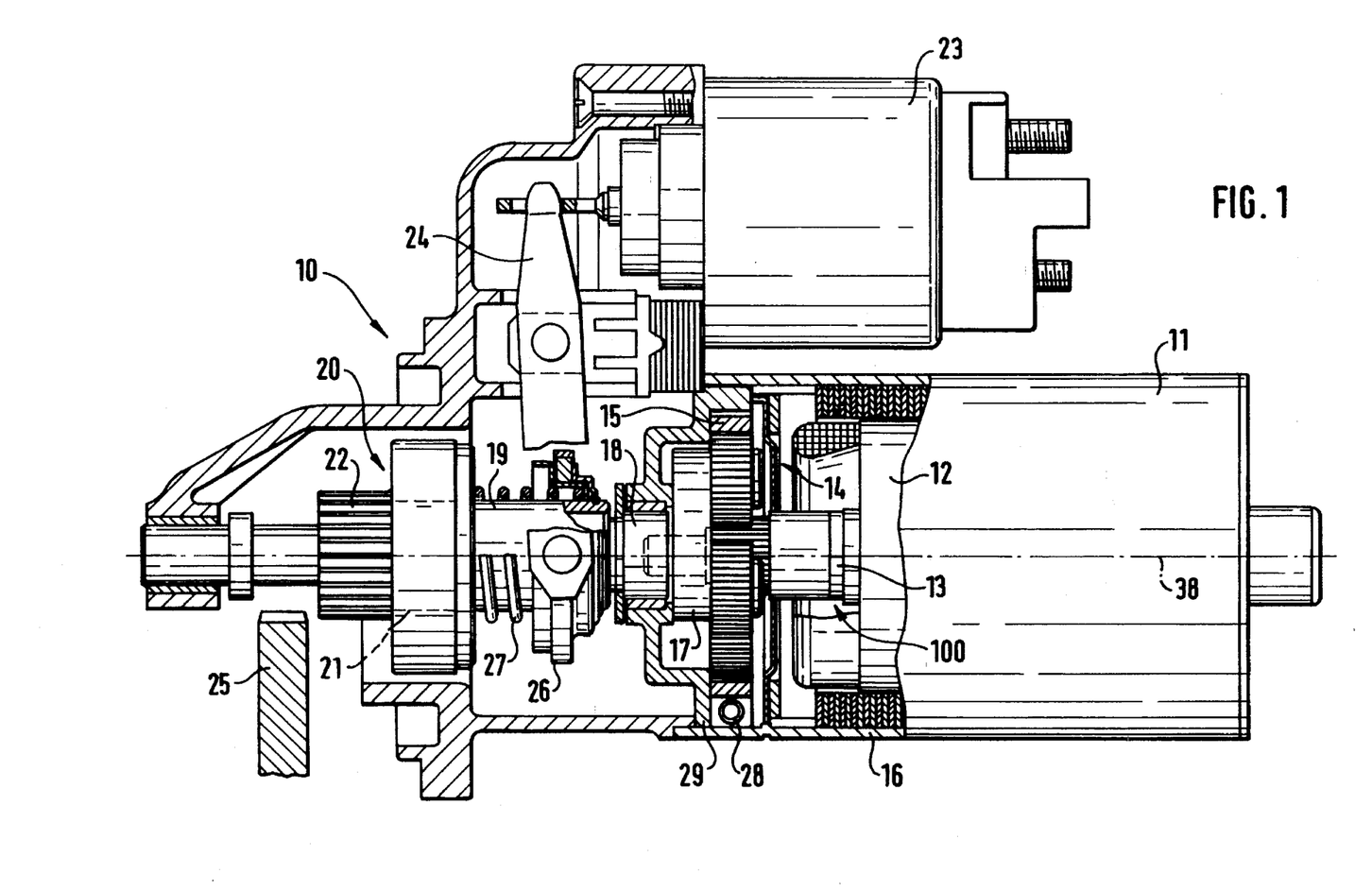
FIG. 1 is a partially side elevational, partially detailed cross-sectional view of one embodiment of a starter apparatus according to the invention with a shock absorber spring device and planetary gear.

A starter according to the invention is shown in FIG. 1. It contains a direct current motor acting as starter motor 11, whose armature 12 is connected by an armature shaft 13 with transmission gear unit 14. A hollow gear 15 of the transmission gear unit 14 is accommodated in the housing 16 of the starter 10 and a planet gear support 17 is rigidly connected with a transmission gear shaft 18 of the transmission gear unit 14. The transmission gear shaft 18 is connected by an unshown coarse thread in a known way in operation with a carrier shaft 19 of a free wheel clutch 20 having a hub 21. The hub 21 of the free wheel clutch 20 is connected rigidly with a starting gear 22. For starting the internal combustion engine the starting gear 22 is advanced by a starter lever 24 driven by a starter relay 23 so that the starting gear 22 engages in a ring gear 25 of the internal combustion engine and rotates via the free wheel clutch 20 and the carrier shaft 19 because of the course thread connection. The starter lever 24 engages with its lower end in a guide ring 26, which bears by a meshing spring 27 against the housing of the free wheel clutch 20. The entire assembly of rotating parts from the starting gear 22 to the rotor or armature 12 of the starter motor forms a starter drive train 100 with an inertial moment or inertia determined by the mass of the rotating parts, which in the case of the transmission gear containing starter is essentially smaller than the starter with the starter drive train.

Because of different accelerations and different peripheral speeds during the starting process shocks or impacts occur between the starting gear 22 and the transmission gear shaft 18, which depending on the abruptness of the impact and the maximum impact moment act more or less strongly mechanically and dynamically on the parts in the drive train of the starter 10. This is particularly the case in the so-called full rotation stage, when after releasing the free wheel clutch 20 in catching up with the starter mechanism the free wheel clutch releases and engages many times, before the internal combustion engine is rotated again by the starter device in a so-called compression stage.

A shock absorber spring means 28 is arranged in the drive train 100 between the starting gear 22 and the drive shaft 13 of the starter motor 11. The shock absorber spring means 28 is arranged here in the transmission gear unit 14 of the drive train, and is inserted between the hollow gear 15 of the planetary gear unit and a part of the housing 16 provided as a bearing member 29 for the planetary gear.

Figure 2:
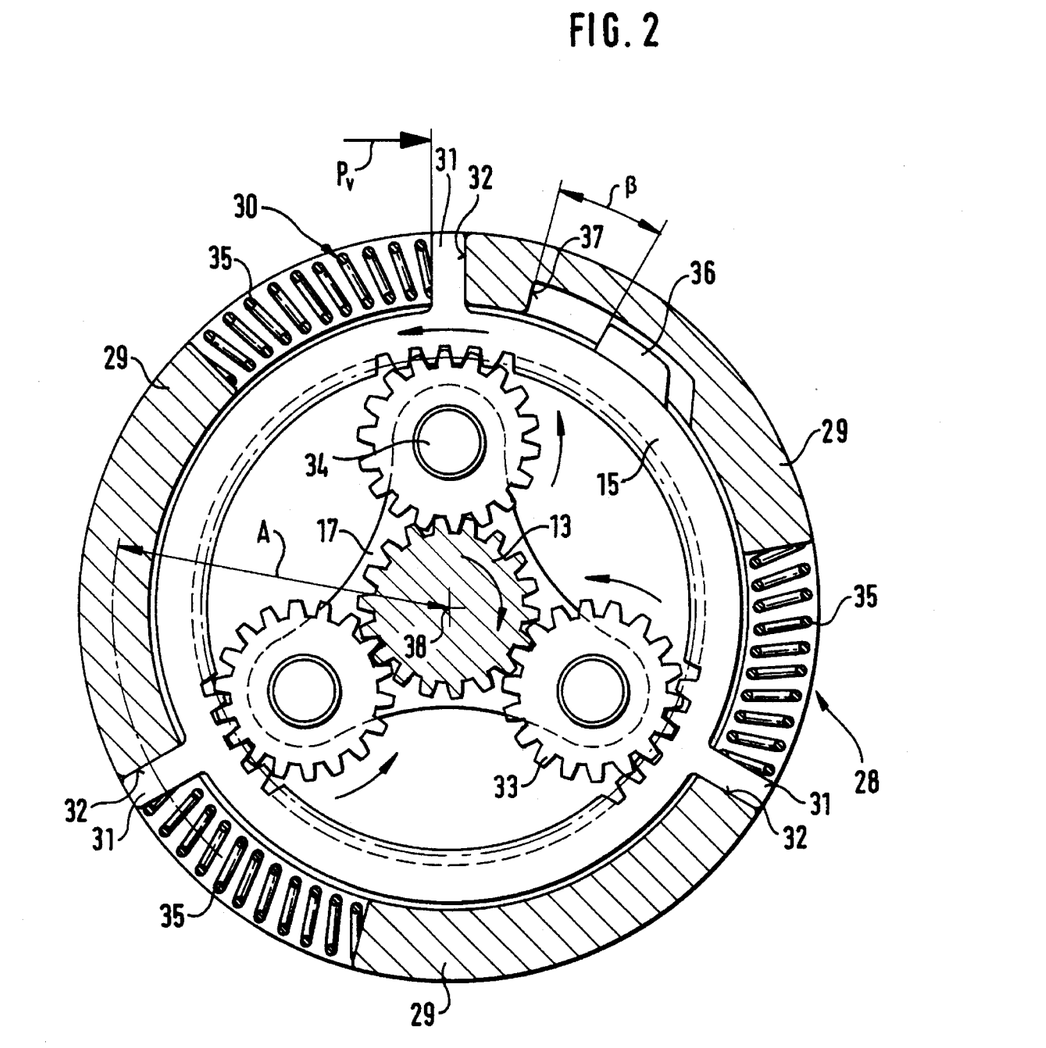
FIG. 2 is a cross-sectional view through the planetary gear from the embodiment of FIG. 1 with three coil springs between the housing and the hollow gear.

The shock absorber spring means 28, as shown in FIG. 2, comprises a plurality of engaging shock absorber spring elements 30 distributed around the circumference of the hollow gear 15. One end of each of the spring elements 30 is braced against stationary bearing member 29 and the other end presses a radially exteriorly projecting projecting member or protruding element 31 of the hollow gear 15 with a pressure Pv acting counter to the drive torque of the drive motor against a housing stop 32, i.e. against the housing. The directional arrows shown in the planetary gear unit indicate that the gear teeth at the end of the drive shaft 13 of the starter motor engage with a clockwise rotation direction in the three planetary gears 33, which rotate in the opposite counterclockwise direction as shown in FIG. 2 on bearing pins 34 in the planet gear support 17 of the planetary gear unit and thus the drive torque is transmitted to the hollow gear 15 in a counterclockwise direction as shown in FIG. 2. The planetary gears 33 roll on the hollow gear 15 and, because of that, rotate in the opposite clockwise direction. Since the planet gear support 17 is connected by the free wheel clutch 20 with the starting gear 22, the starter has a clockwise rotating starter mechanism.

In the embodiment shown in FIG. 2 the shock absorber spring elements 30 are pretensioned coil springs 35. It is seen in FIG. 2 that the hollow gear 15 of the planetary transmission gear unit 14 is rotatable during the impacts in the drive direction against the force of the coil springs 35 about an angle β of from about 10° to 15°, limited by an additional stop element 36 formed on the periphery of the hollow gear 15, which acts as an overload protecting element, and contacts on a shoulder 37 of the bearing member 29.

Figure 3A:
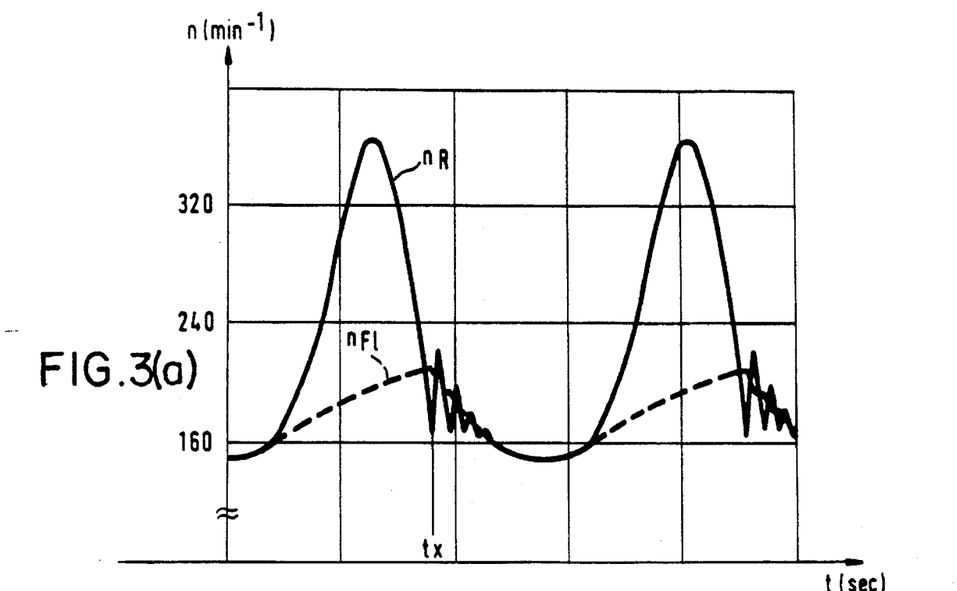
FIG. 3 is a graphical illustration of the relationships between rotation speed at the free wheel clutch of a) a starter of the prior art and b) a similar starter according to the invention.
Figure 3B:
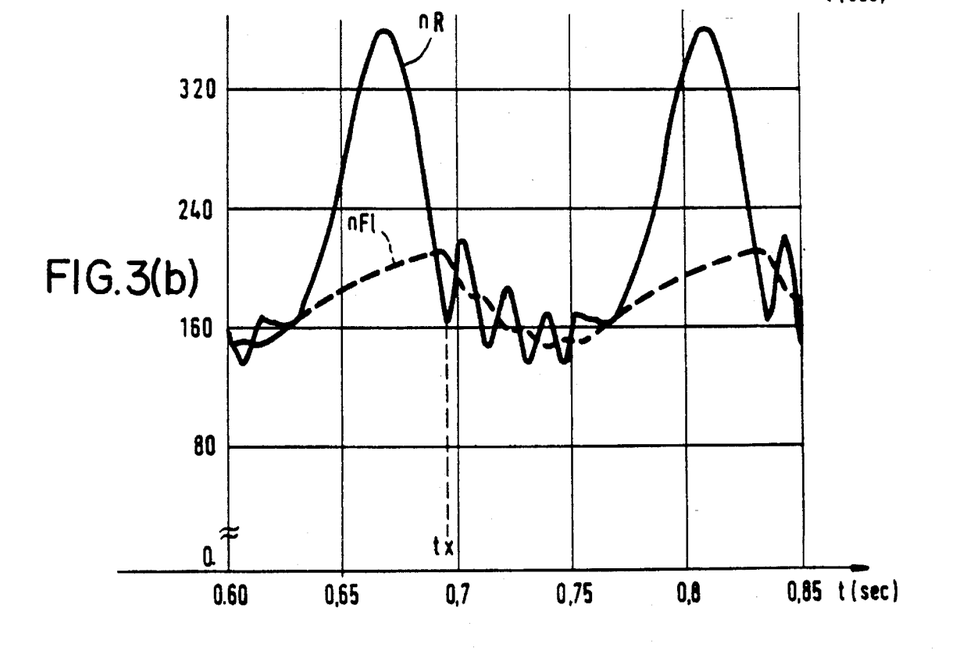
Figure 4:
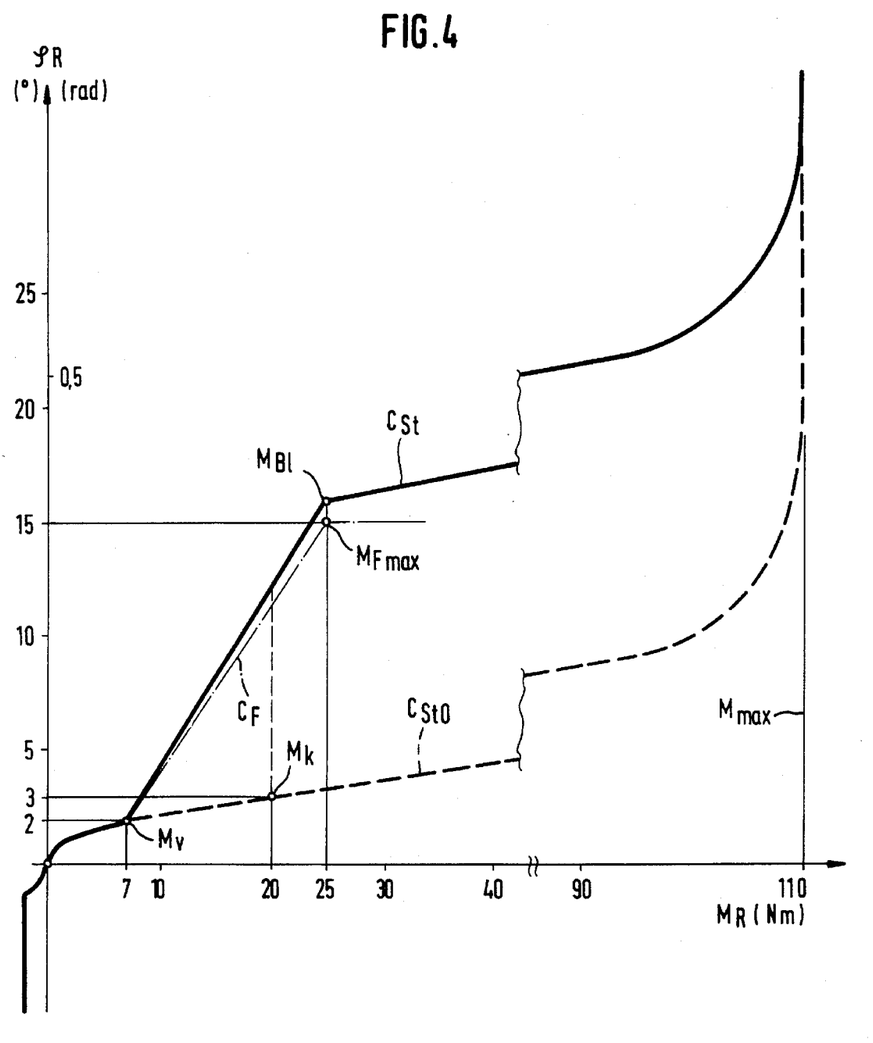
FIG. 4 is a graphical illustration of the rigidity of the starter drive train showing rotation angle versus torque at the ring gear.

The operation and dimensioning of the shock absorber spring means 28 in the starter mechanism according to the invention are more clearly explained with the aid of FIGS. 3 and 4. The starter mechanism has in this example a starter motor with 1.4 kH power. The stall torque Mk acting on the starting gear 22—for example, during attempts at starting the internal combustion engine with a drive with substantial input action—amounts to 20 Nm at the starting gear. The torsional rigidity constant $C_{St0}$ of the drive train 100 of the starter 10 amounts to about 700 Nm rad without the shock absorber spring means 28 on the starting gear side.

FIG. 3 shows two time courses a) and b) of the gear rotation speed $n_R$ as a solid line and the rotation speed $n_{F1}$ at the carrier shaft 19 as a dashed line for two different situations. The time dependence curve a) is for a starter which has the same structure as the starter of the invention shown here but does not have the shock absorber spring means 28 of the invention. In this case at the beginning of the decompression stage in a cylinder of the internal combustion engine the starting gear 22 driving the ring gear 25 of the engine releases the free wheel clutch 20, since it catches up with the drive motor 11 with the rotation speed $n_{F1}$. During the subsequent compression stage now the gear speed $n_R$ drops under the rotation speed $n_{F1}$, so that now the free wheel clutch 20 engages with an impact after running through the entire play of the starter device 10. After that a plurality of spike-like oscillations of the gear rotation speed occur so that the free wheel clutch 20 partially releases and closes periodically.

The situation with the shock absorber spring means 28 according to the invention is shown in case b) under case a) in FIG. 3. A nearly exactly sinusoidal oscillation with a clearly reduced wavelength occurs at time tx so that the impact on engagement of the free wheel clutch 20 at time tx is substantially damped and the multiple releasing of the coupling is reduced. Below case b) the time scale from the process is shown on time axis t. Since the increase of the gear rotation speed $n_R$ is substantially reduced on engagement of the free wheel clutch 20 at time tx, an appropriate reduction of the impact moment occurs.

The time behavior of the starter according to the invention shown in case b) in FIG. 3 is obtained because the shock absorber spring means 28 is acting with a compression torque Mv in the drive direction between the starting gear 22 and the drive shaft 13 of the starter motor, which on the starting gear side amounts to between 15 and 50 percent of the stall torque Mk of the starter motor 11 relative to gear shaft rotation. Furthermore the ratio of the torsional rigidity $C_{St0}$ of a drive train formed by the parts from the starting gear 22 to the starter motor 11 but with an ineffective or absent shock absorber spring means 28 to the torsional rigidity $C_F$ of the shock absorber spring means 28 related to the stall torque Mk is from ¼ to ⅒ advantageously.

In FIG. 4 the rotation angle φR of the drive train 100 of the starter 10 relative to the gear shaft depends on the torque $M_R$ acting on the starting gear 22. The increasing dashed curve of 1/Cst0 in FIG. 4 shows the reciprocal of the torsional rigidity of the drive train of the starter apparatus 10 without shock absorber spring means in the drive direction. The first two angular rates of the starting gear rotation are determined by the different nonlinear processes present between the ring gear 25, the clutch and the drive shaft 13. Without the shock absorber spring means 28 now a linear increase of the dashed curve occurs with increasing torque, which shows the effective torsional rigidity of the drive train. In the upper region of the dashed curve the free wheel clutch 20 engages so that the steepness of the curve increases, until it makes a full rotation to a maximum torque $M_{max}$. The stall torque Mk of the starter 10 is fundamental to obtain reproducible values in the determination of the torsional rigidity $C_{St0}$, since in this region (in the straight branch of the curve) of the dashed characteristic line the torsional rigidity $C_{St0}$ of the drive train has a definite constant value, which in this embodiment shown in the drawing amounts to 700 Nm/rad. The stiffness of the dot-dashed curve 1/$C_F$ shows the reciprocal of the torsional rigidity of the shock absorber spring means 28 effective at the starting gear 22. The torque Mn of the shock absorber spring means 28 effective at the starting gear due to prestressing of the spring elements amounts to 7 Nm, which is 35% of the stall torque Mk of 20 Nm. The shock absorber spring means 28 is responsive on exceeding these values. Its torsional rigidity amounts to $C_F$=60 Nm/rad. The ratio of the torsional rigidity of the drive train 100 to the torsional rigidity of the shock absorber spring means 28 is for example given by a factor F:

$$F = C_{St0}/C_F = 700/60 = 11.66$$

Moreover in a normal starting process, especially in the full rotation stage, the impacts occurring on engagement of the free wheel coupling 20 are damped by the reduced torsional rigidity in the embodiment with the shock absorber spring means 28 so much that the starting gear oscillations do not reach the maximum rotation angle $\phi_R$ of about 15° predetermined by the placement of the stop element 36. This maximum rotation angle necessitates a torque $M_{Fmax}$ of about 25 Nm related to the starting gear, which is close to the upper stall torque Mk and which is exceeded only in the case of a so-called reignition.

The actual torsional rigidity $C_{St}$ of the starter drive train 100 with the shock absorber spring means 28, which is shown as its reciprocal 1/Cst in FIG. 4 by the solid curve, results from the superposition of the torsional rigidity $C_F$ of the shock absorber spring means 28 with the torsional rigidity of the shock-absorber-spring-means-less starter drive train. This curve shows that in the region up to the torque Mv due to prestressing the shock absorber spring means 28 because of its tension does not respond, that in the region from Mv to $M_{B1}$ the rotation of the starting gear 22 by the shock absorber spring means 28 and the drive train adds and that on attaining a blocking torque $M_{B1}$, when the stop element 36 contacts on the shoulder 39 of the bearing member 29, again the original torsional rigidity of the starter drive train 100 operates until the free wheel clutch 20 makes a full rotation with additional increasing torque.

The action of the shock absorber spring means 28 is determined by the chosen prestressing and by the spring constant $C_{Fe}$ of the spring elements 30 used to make up the shock absorber spring means 28. In the embodiment with the three spring elements 30 according to FIG. 2 the compression Pv=77N with a spacing to the axis 38, A=30 mm results, so that the prestressing torque Mv=3 Pv×A=7 Nm and from the spring constant $C_{Fe}$=22 N/m the spring elements 30 for the shock absorber spring means 28 have a torsional rigidity $C_F = C_{Fe} \cdot 3 \cdot A^2 = 60$ Nm/rad.

The torque Mv of the shock absorber spring means 28 due to prestressing should not be less than 15% of the stall torque Mk of the starter motor, since otherwise the required spring displacement and rotation angle for absorbing shocks or impacts in the drive direction is too large to maintain the starter compactness and since the spring elements then among other things can produce their own noise by vibrating. The torque Mv due to prestressing should not be more than 50% of the stall torque Mk, since otherwise the shock absorber spring means 28 is acted only on a little or not at all by the shocks occurring in the normal starting process and thus the damping of the shocks does not occur.

The action of the shock absorber spring means 28 is moreover lost if the torsional rigidity constant $C_F$ is too large. The ratio F of the torsional rigidity of the starter to the torsional rigidity of the shock absorber spring means 28 is thus selected to be larger than 4. The eigenfrequency $Fo_{St}$ of the rotary oscillation of the drive train 100 depends on its inertial moment $J_{St}$ (related to the gear shaft) and its torsional rigidity constant $C_{St0}$ according to the equation:

$$F_O = \pi/2 \times \sqrt{C_{St}/J_{St}}$$

(engine considered as stiff)

With unchanged moment of inertia of the starter-drive train the eigenfrequency $fo_{St1}$ of the rotary oscillations of the drive train in the embodiment with the shock absorber spring means 28 are reduced to less than half of the corresponding eigenfrequency $fo_{St}$ without the shock absorber spring means. In the exemplary case this amounts to $$fo_{St1} = fo_{St} \sqrt{C_F/C_{St0}}$$
$$= \sqrt{60/700} \times fo_{St} = 0.29 fo_{St};$$

this means less than ⅓ of the eigenfrequency of the drive train originates from the eigenfrequency of a corresponding drive train without the shock absorber spring means 28.

Figure 5:
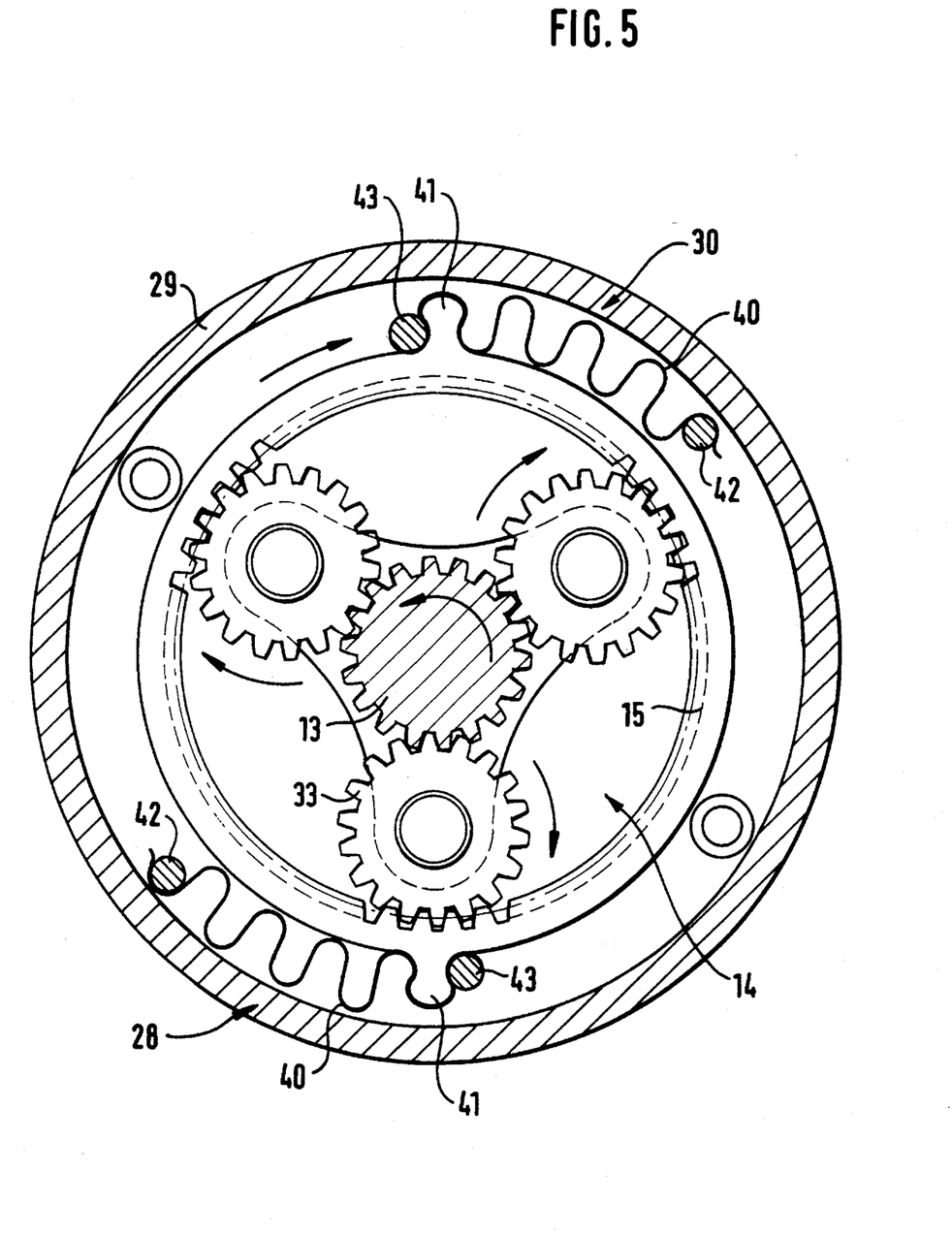
FIG. 5 is a cross-sectional view through a planetary gear showing a meandering curved leaf spring acting as the shock absorber spring element between the housing and the hollow gear in another embodiment of the invention.

FIG. 5 shows an additional embodiment for a counterclockwise running transmission gear unit 14 formed as a planetary drive gear of the starter 10, in which the shock absorber spring means 28 is formed from two spring elements 30 diametrically opposite to each other. These spring elements 30 comprise meandershaped curved leaf springs 40, which are inserted as compression springs between the hollow gear 15 and the bearing member 29. The respective ends of the leaf springs 40 are clamped in a clasp-like manner between a protruding element 41 on the outer circumference of the hollow gear 15 and clamping element 42 on the bearing member 29 so that they can act in the drive direction. The hollow gear 15 is pressed with the two protruding elements 41 against respective stop elements 43 on the bearing member 29 by action of the leaf spring 40. Both of the leaf springs 40 form the shock absorber spring means 28, whose clamping moment at the starting gear 22 and torsional rigidity are determined by the strength and form of the leaf springs 40.

Figure 6:
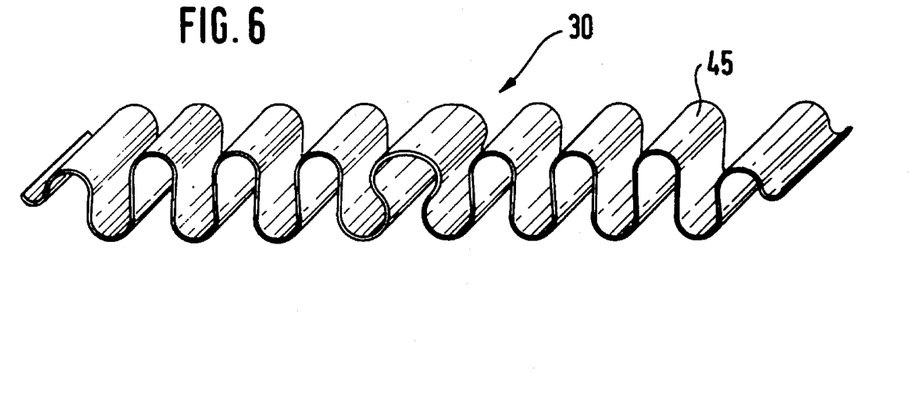
FIG. 6 is a perspective view of a meandering curved leaf spring acting as shock absorber spring element in the hollow gear received in the housing.
Figure 7:
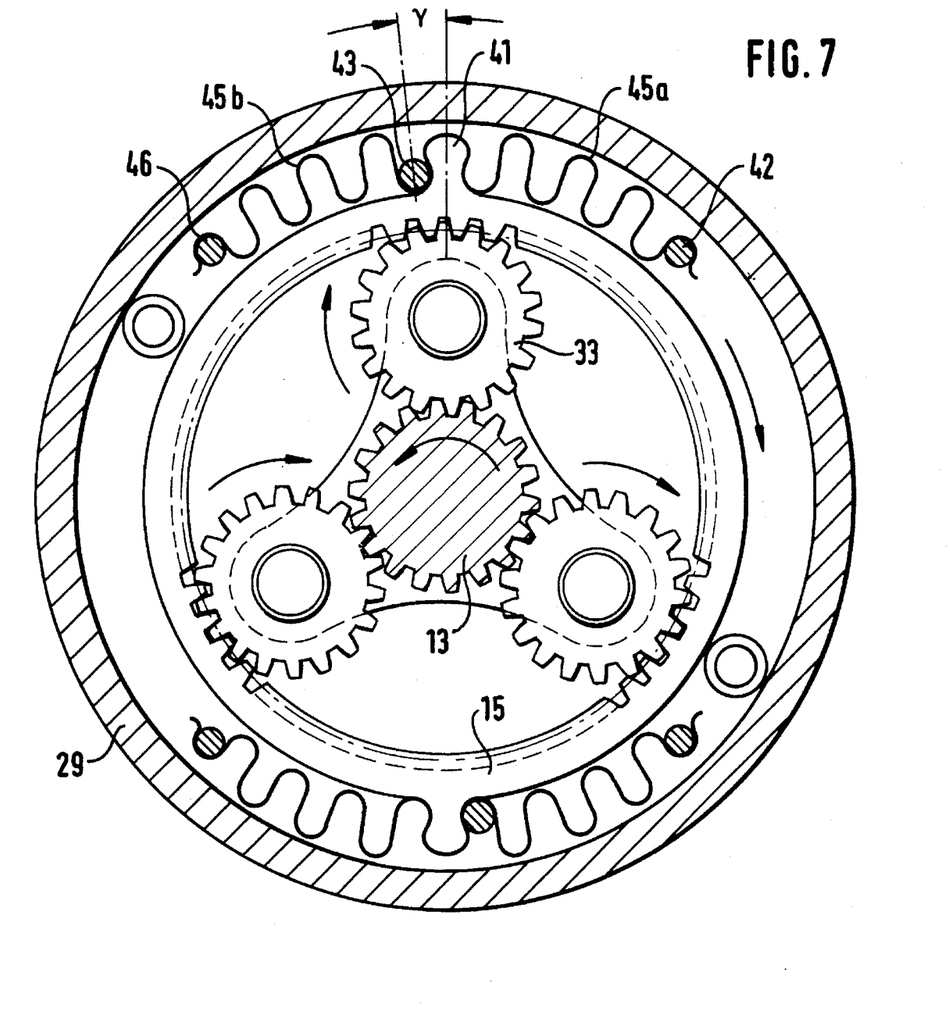
FIG. 7 is a cross-sectional view through a planetary gear with two leaf springs as shown in FIG. 6 between the hollow gear and the housing.

In FIGS. 6 and 7 another embodiment of the starter according to the invention is shown, in which two meanderform curved leaf springs 45 are positioned diametrically opposite to each other on the circumferential region of the hollow gear 15. The respective ends of each leaf spring 45 are clamped in a clasp-like manner on the clamping elements 42 and 46 on the bearing member 29. In the central region the leaf spring 45 is held on a protruding element 41 on the outer periphery of the hollow gear 15. For adjustment of the tension of the leaf spring 45 the hollow gear 15 is rotated from the neutral position of the leaf spring 45 an amount x in the drive direction and then clamped or braced on the pressing element 43 of the bearing member 29. Because of that, the leaf spring 45 acts with its region 45a in front of the pressing or stop element 43 in the direction the spring acts as a compression spring and with its region 45b to the rear of the pressing element 43 as a tension spring. The compression of the leaf spring 45 adjusts itself according to the size of the rotation angle in the direction in which contact is made.

Figure 8:
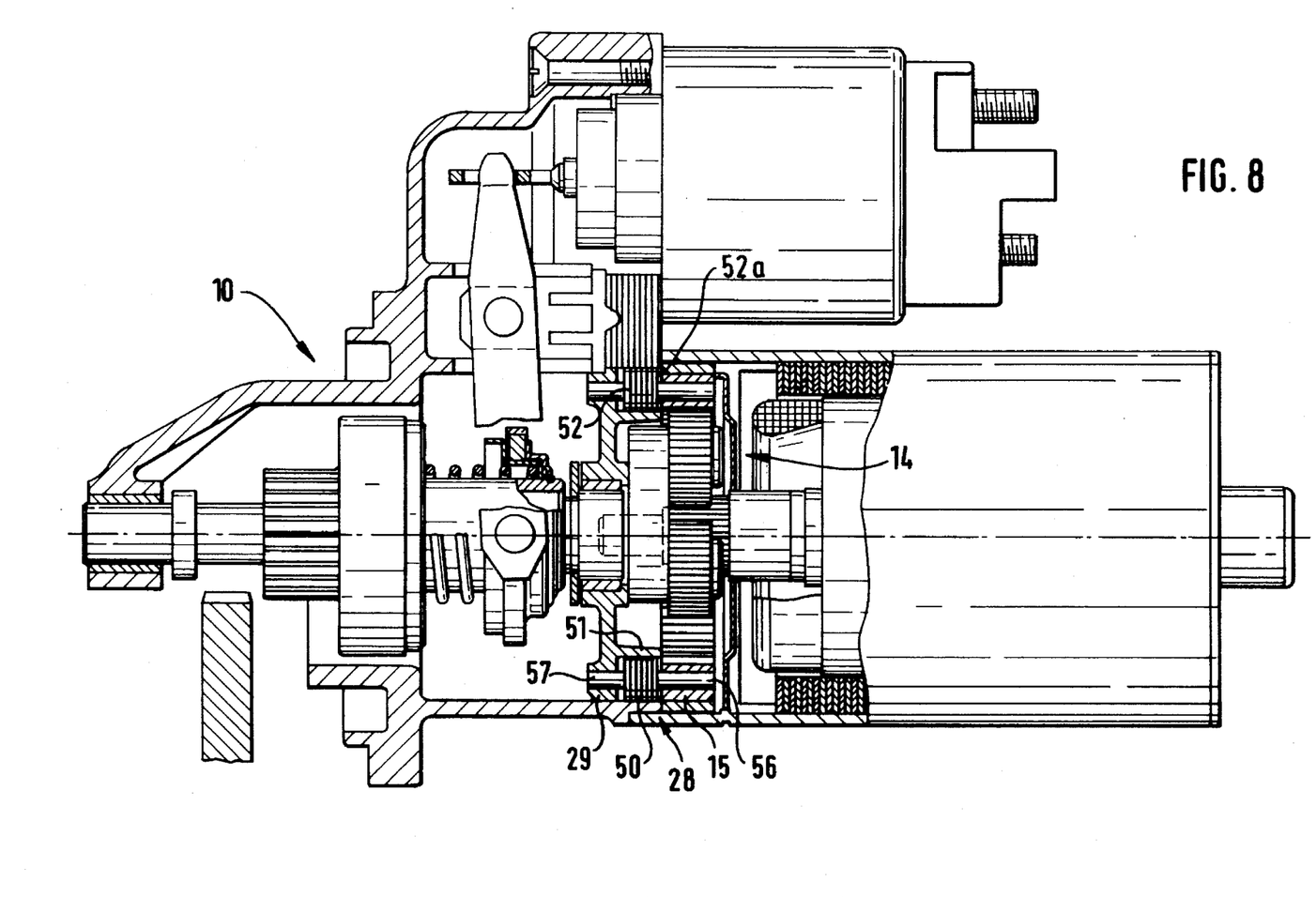
FIG. 8 is a partially side elevational, partially detailed cross-sectional view of another embodiment of a starter apparatus according to the invention with a leg spring set.

FIGS. 8 to 12 show additional embodiments of the starter 10 according to the invention with shock absorber spring means 28 in the drive train of the starter. The shock absorber spring means 28 comprises a leg spring set 50 which is already known. FIG. 8 is a cross-sectional view of the starter of this embodiment showing the leg spring set 50 in front of the hollow gear 15 on a collar 51 of the bearing member 29 of the housing 16. The leg spring set 50 comprises a plurality of axially side-by-side spring segments 52.

Figure 9:
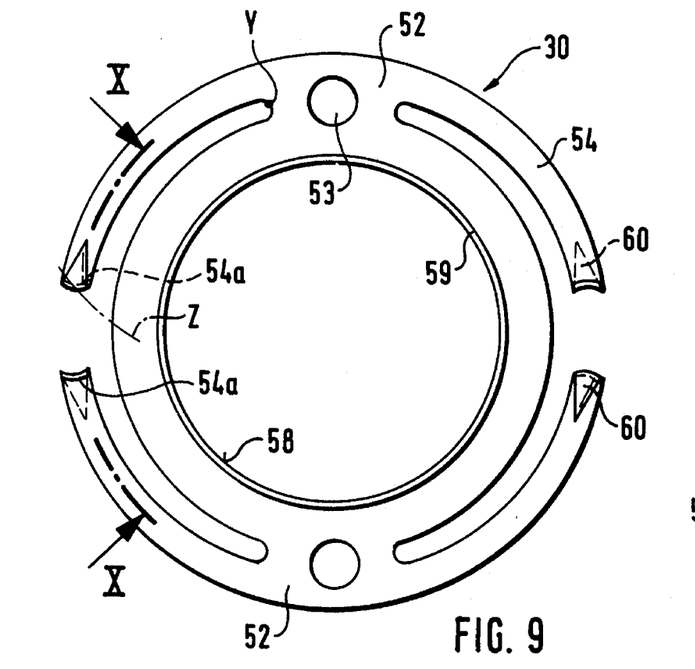
FIG. 9 is a plan view of a spring segment with a hook from the apparatus shown in FIG. 8.
Figure 10:
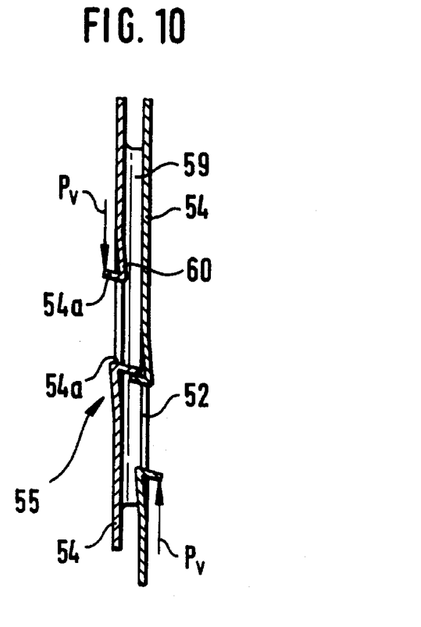
FIG. 10 is a cross-sectional view through two connected spring segments according to FIG. 9 taken along the section line X—X of FIG. 9(which shows only one of the spring segments)

FIG. 9 shows one of the spring segments 52, which is punched from a spring steel sheet and has two throughgoing holes 53 punched in it diametrically opposite each other. As shown in FIG. 10 connecting means 55 are formed on the free ends of the spring legs 54 on each side of each of the holes 53, which are engaged with connecting means 55 on adjacent or neighboring spring segments 52 of the set. Since FIG. 10 is a cross-sectional view taken along the section line X—X in FIG. 9, one sees that the free ends of the spring legs 54 are bent at right angles alternately to one or the other side (in and out of the plane of FIG. 9) to form hook elements 54a, so that the spring legs 54 on neighboring spring segments 52 engage in each other at their free ends. By bent "alternately" it is meant that the free ends on opposing spring legs 54 on the same side of the spring segment 52 are bent out of the plane of the spring segment in opposite directions. The leg spring set 50 is arranged concentrically in the transmission gear unit 14 under tension in the starter 10 so that the right end segment 52a (right end in FIG. 8) is held with the hole 53 on the pin 56 on the hollow gear 15 and the left end segment is held with its hole 53 on the corresponding pin 57. Because of the hook elements 54a formed at the free ends 54a the compression force Pv acts on the spring legs 54, the ends of the spring legs 54 bend inwardly about their bending axis Y along the dot-dashed line Z.

An axially compact shock absorber spring means 28 can be built up from equal parts comprising spring elements 30 in the form of easily punched spring segments 52 in this embodiment. The outer spring segments 52a are connected with the remaining spring segments 52 for transmission of the spring forces by the connecting means 55. The force transmission because of the hole 53 in the end segments 52 is particularly appropriate, since by themselves the ends of the spring legs 54 move inwardly with increasing load and thus friction and eventually wear could occur on engagement of the spring legs 54 on the hollow gear 15 and/or the bearing member 29. The inner throughgoing passage 58 of the spring segments 52 has a small collar 59, which acts to provide a spacing between the individual spring segments 52, so that between the spring segments 52 only a minimal friction occurs. The hook elements 54a of the spring legs 54 can be provided with a crimped portion 60 for reinforcement.

Figure 11:
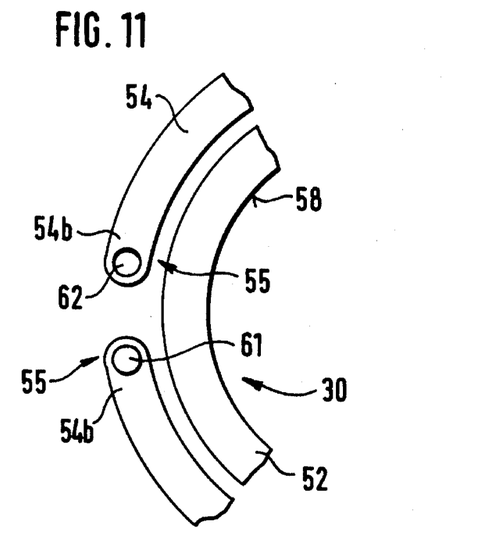
FIG. 11 is a cutaway plan view of a portion of a spring segment showing catch element and recess at respective ends of opposing spring legs.
Figure 12:
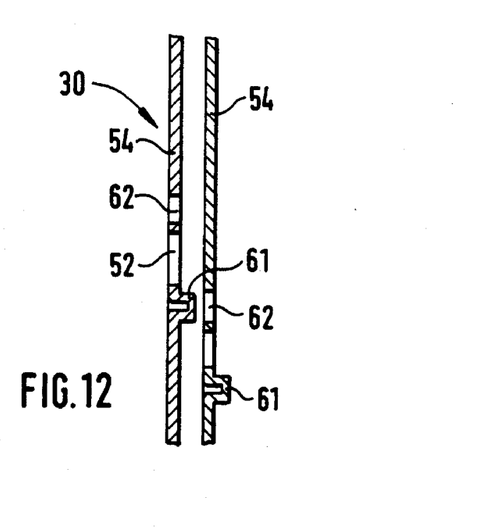
FIG. 12 is a cross-sectional view of two connected spring segments according to FIG. 11 taken along the section line XII—XII(FIG. 11 showing only one of the spring segments)

Another embodiment of the connecting means 55, in which the respective free end portions 54b of the spring legs are provided alternately with a catch element 61 and a corresponding catch hole or recess 62, instead of the right angle bend in the spring legs 54 of the previous embodiment, as shown in FIGS. 11 and 12. As shown in FIG. 12 with this connecting means 55 the catch element 61 on one spring leg 54 can engage in the catch hole 62 in the neighboring spring leg to make the connection between the spring legs. Also here the compact leg spring set is mounted under tension by rotation in the direction of the drive torque of the end spring segments between the fixed pins 57 of the bearing member 29 and the pins 56 of the hollow gear 15. Also here the hollow gear bears on the housing-fixed stop means in the configuration under tension.

Since these spring elements are centered by the inner passage 58, shock absorber spring means 28 with this type of spring element 30 is also suitable for use in a rotating arrangement, for example between the drive of the planetary gear unit 14 and the free wheel clutch 20 or between the free wheel clutch 20 and the starting gear 22. Imbalance problems caused by mass distribution changes as a result of wear are largely prevented. Also like the other embodiments of the shock absorber spring means an overload protection is guaranteed by a rotary connection between the hollow gear 15 and the housing-fixed bearing member 29, as shown in FIG. 2.

Figure 13:
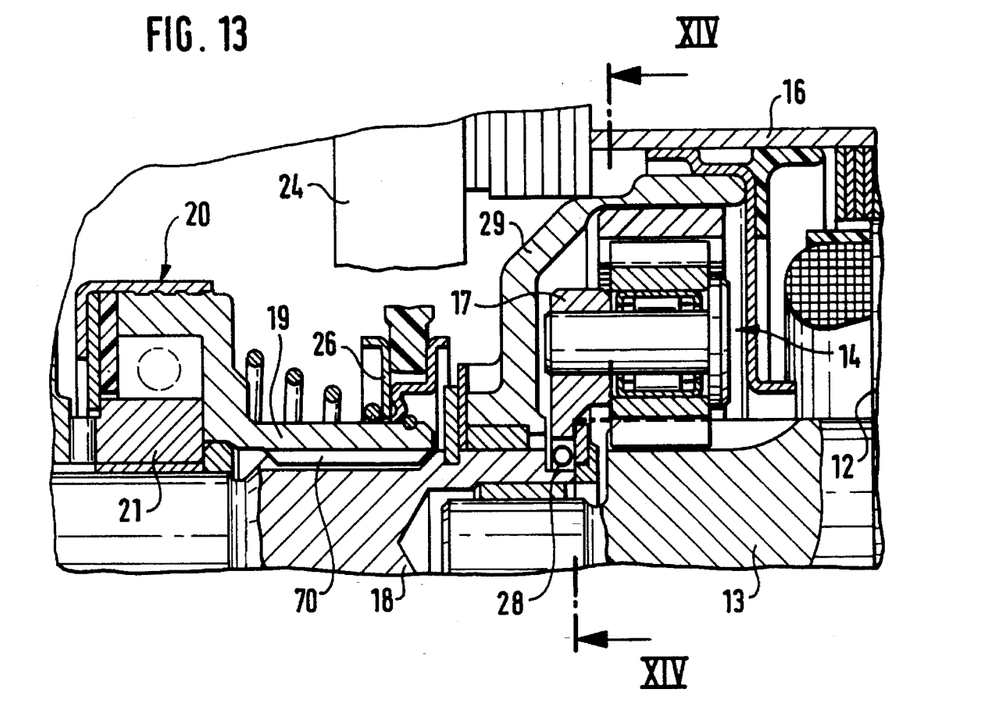
FIG. 13 is a cutaway cross-sectional view of a part of the drive train of a starter according to the invention with transmission gear.
Figure 14:
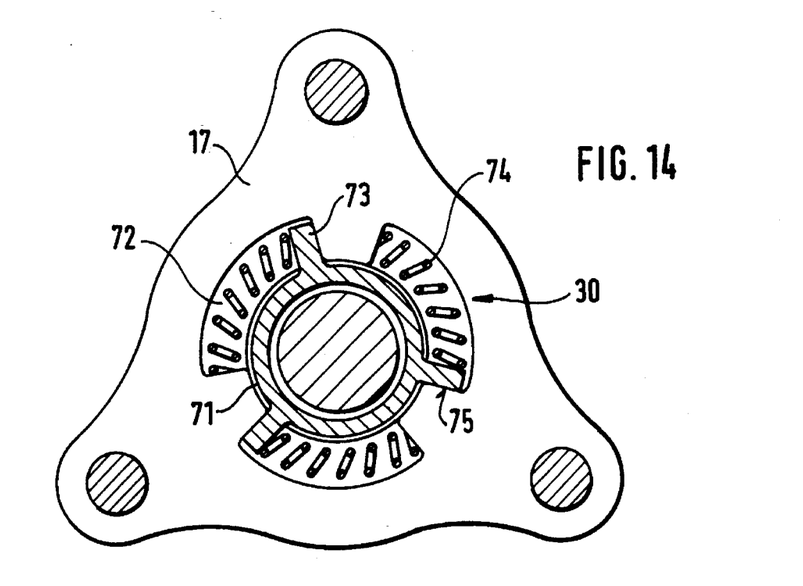
FIG. 14 is a cross-sectional view through the transmission gear unit showing three coil springs acting as shock absorber spring means between the planetary gears and transmission gear shaft of the transmission gear unit of FIG. 13 in an additional embodiment of the invention.

Another embodiment is shown in FIGS. 13 and 14, in which the shock absorber spring means 28 engages on one end in the transmission gear unit 14 and on the other end on the drive shaft 18, which cooperates with the carrier shaft 19 of the free wheel clutch 20 by the coarse thread 70. In this embodiment too the transmission gear unit is a planetary gear, whose gear support 117 has a central opening 71 for receipt of the drive shaft 18. From FIG. 14 one can see that this central opening 71 has three circumferentially distributed cavities 72, in which a radially outwardly extending rib element 73 of the transmission gear shaft 18 projects. Further spring elements 30 of the shock absorber spring means 28, which are in the form of coil springs, are positioned in these cavities 72, each of which are braced under tension with one end on a rib element 73 and with the corresponding opposite end on a shoulder 75 of the cavity 72.

Figure 15:
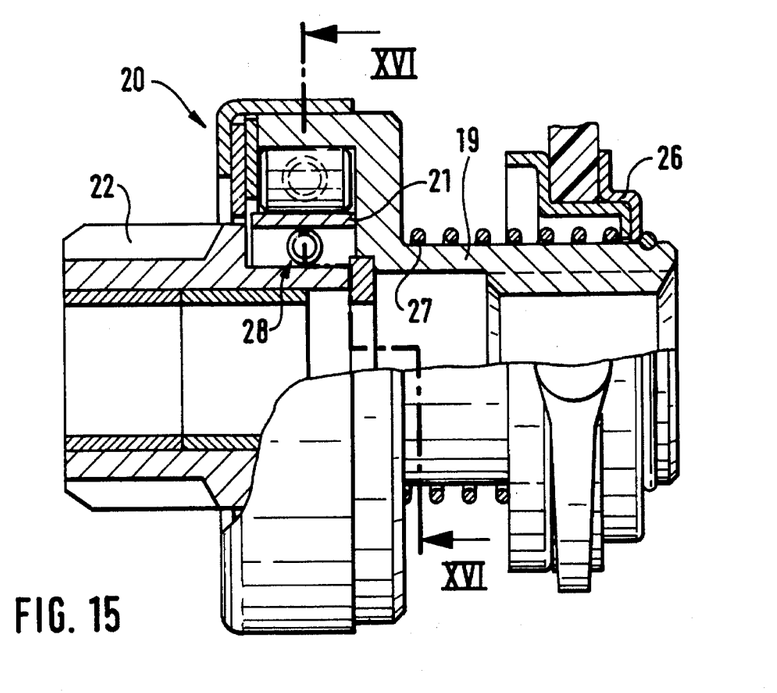
FIG. 15 is a partially side, partially longitudinal cross-sectional view through an embodiment with a shock absorber spring means between a free wheel clutch hub and starting gear.
Figure 16:
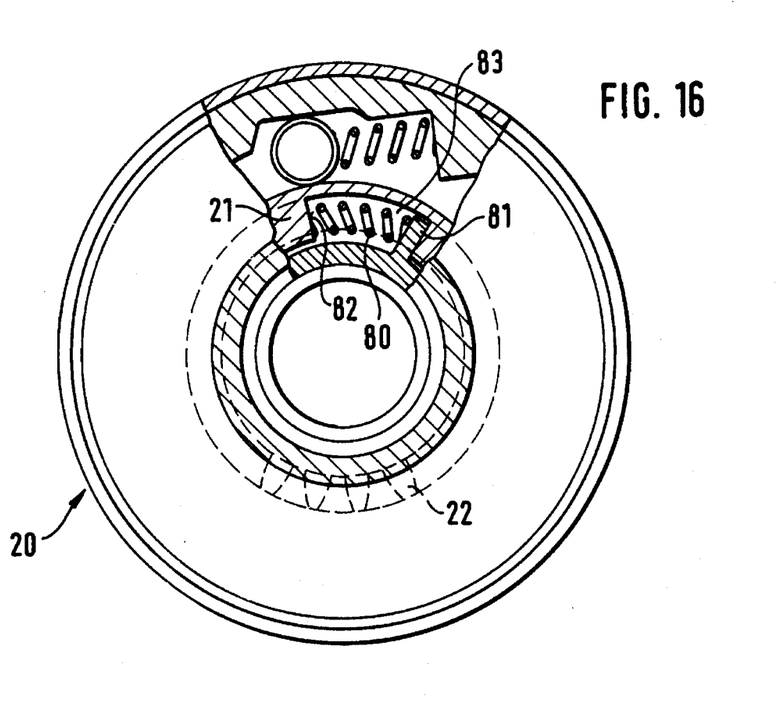
FIG. 16 is a partially front view, partially cutaway cross-sectional view through the free wheel clutch shown in FIG. 15.

Still another embodiment of the starter 10 is shown in FIGS. 15 and 16 which show only the portion of the drive train of the starter with the guide ring 26, the starter spring 27, the carrier shaft 19, the free wheel clutch 20 and the starting gear 22. The shock absorber spring means 28 engages at one end on the free wheel clutch 20 and at the other end on the starting gear 22. From FIG. 16 one can see that in this embodiment also coil springs 80 are distributed circumferentially between the hub 21 of the free wheel clutch 20 and the starting gear 22, in which the coil springs 80 are held under tension in a similar manner as in FIG. 14 between a radially outwardly direction rib element 81 on the starting gear 22 and a shoulder 82 of the cavity 83 in the hub 21.

The embodiments of the starter 10 which are shown are designed for a certain rotation direction so that the shock absorber spring means 28 is of course designed for that drive direction.

While the invention has been illustrated and described as embodied in a starter apparatus for an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

What is claimed is:

1. A starter apparatus comprising a starter motor provided with a drive shaft and having a stall torque; an axially shiftable starting gear engageable with a ring gear of an internal combustion engine; a drive train means for transferring rotary motion of said drive shaft of said starter motor to said starting gear, said drive train means having a torsional rigidity and including a plurality of parts from said starting gear to said drive shaft; a free wheel clutch coupled with said drive shaft of said starter motor; and a shock absorber spring means for damping torque shocks between said starting gear and said drive shaft occurring on rotation of said drive shaft, said shock absorber spring means being located in said drive train means between said starting gear and said drive shaft of the starter motor, wherein said shock absorber spring means is prestressed to provide a torque acting in a drive rotation direction equal to from 15 to 50% of said stall torque of said starter motor delivered to said starting gear, and wherein a ratio of a torsional rigidity of another drive train means equal to said drive train means without said shock absorber spring means and at said stall torque (Mk) to a torsional rigidity of said shock absorber spring means effective at said starting gear must be at least 4.

2. The starter apparatus as defined in claim 1, wherein said torsional rigidity of said shock absorber spring means is such that said drive train means has at least one eigenfrequency for rotational oscillation less than half of at least one eigenfrequency of said other drive train means without said shock absorber spring means, said at least one eigenfrequency of said other drive train means being for rotational oscillation of said other drive train means.

3. The starter apparatus as defined in claim 2, wherein said free wheel clutch has a hub and said shock absorber spring means comprises a plurality of spring elements distributed circumferentially between said hub of said free wheel clutch and said starting gear.

4. The starter apparatus as defined 2, wherein said drive train means comprises a transmission gear means connected to said free wheel clutch and said shock absorber spring means is prestressed and is connected with said transmission gear means and said free wheel clutch.

5. The starter apparatus as defined in claim 4, wherein said transmission gear means has a planet gear support and a transmission gear shaft and said shock absorber spring means comprises a plurality of spring elements distributed circumferentially between said planet gear support and said transmission gear shaft of said transmission gear unit.

6. The starter apparatus as defined in claim 4, wherein said shock absorber spring means is located in said transmission gear means of the drive train means.

7. The starter apparatus as defined in claim 6, further comprising a housing including a bearing member, and wherein said transmission gear means comprises a planetary gear unit including a hollow gear and said shock absorber spring means is arranged between said hollow gear and said bearing member of said housing.

8. The starter apparatus as defined in claim 7, wherein said shock absorber spring means comprises a leg spring set consisting of a plurality of spring segments placed side-by-side, each of said spring segments having circumferentially disposed spring legs with free ends and connecting means for connecting said spring segments at said free ends of said spring legs, said connecting means acting to hold adjacent ones of said spring segments together in said leg spring set.

9. The starter apparatus as defined in claim 8, further comprising means for tensioning said leg spring set by rotation of an end segment of said spring segments in said drive rotation direction with said hollow gear bearing on said bearing member of said housing.

10. The starter apparatus as defined in claim 8, wherein said spring segments of said spring leg set are provided with a throughgoing passage, said spring legs are arranged concentrically around said throughgoing passage and one end segment of said spring segments engages in said hollow gear and another end segment of said spring segments engages in said bearing member.

11. The starter apparatus as defined in claim 10, wherein said free ends of said spring legs in each of said spring segments are alternately provided with a catch element and a catch hole, said catch hole being a throughgoing hole in one of said free ends and said catch element being provided on another of said free ends so that said connecting means comprises said catch elements and said catch holes.

12. The starter apparatus as defined in claim 10, wherein said free ends of said spring legs of at least one of said spring segments are bent at right angles alternately to point in one of two perpendicular directions relative to a plane passing through said at least one spring segment so as to form hook elements so that said connecting means of said at least one spring segment comprises said hook elements.

13. The starter apparatus as defined in claim 7, wherein said shock absorber spring means comprises a plurality of spring elements distributed circumferentially around said hollow gear and braced on said bearing member of said housing.

14. The starter apparatus as defined in claim 13, wherein said hollow gear includes a plurality of protruding elements, said housing includes a plurality of housing stops, each of said spring elements is prestressed and presses one of said protruding elements of said hollow gear against one of said housing stops with a pressure (Pv).

15. The starter apparatus as defined in claim 14, wherein each of said protruding elements is directed radially outwardly from said hollow gear and said spring elements and said protruding elements are arranged on an outer circumference of said hollow gear.

16. The starter apparatus as defined in claim 15, wherein each of said spring elements is a precompressed coil spring.

17. The starter apparatus as defined in claim 13, wherein each of said spring elements is a meandering curved leaf spring.

18. The starter apparatus as defined in claim 17, wherein each of said leaf springs is a precompressed spring having two ends and a center portion and said two ends are clamped to said bearing member on opposite sides of said center portion and said center portion is clamped to at least one protruding element projecting radially from an outer periphery of said hollow gear, so that said hollow gear shifted from a neutral position determined by said leaf springs in said drive rotation direction presses on a stop element fixed on said housing.

19. The starter apparatus as defined in claim 17, wherein said hollow gear has a plurality of protruding elements and said bearing member has a plurality of clamping elements, each of said leaf springs is a precompressed spring having two ends, and one of said two ends of each of said leaf springs is clamped in a clasp-like manner to one of said protruding elements and another of said two ends is clamped to one of said clamping elements.

20. The starter apparatus as defined in claim 1, further comprising a housing and overload protection means for protecting said shock absorber spring means from overloads.

21. The starter apparatus as defined in claim 20, wherein said housing includes a bearing member; said drive train means comprises a transmission gear means connected to said free wheel clutch; said transmission gear means comprises a planetary gear unit including a hollow gear; said shock absorber spring means is arranged between said hollow gear and said bearing member, and said overload protection means includes stop means for limiting motion of said hollow gear in said drive rotation direction, said stop means including an additional stop element protruding from an outer circumference of said hollow gear and a shoulder of the bearing member.

* * * * *